(12) United States Patent
Andrews (10) Patent No.: US 7,118,159 B1
(45) Date of Patent: Oct. 10, 2006

(54) CONVERTIBLE TONNEAU COVER

(76) Inventor: Gary Randall Andrews, 5325 Pine Tree Rd., Panama City, FL (US) 32404-5308

( * ) Notice: Subject to any disclaimer, the term of this patent is extended or adjusted under 35 U.S.C. 154(b) by 0 days.

(21) Appl. No.: 11/377,758

(22) Filed: Mar. 15, 2006

(51) Int. Cl.
*B60P 7/02* (2006.01)

(52) U.S. Cl. .............................. 296/100.06; 296/100.07

(58) Field of Classification Search ........... 296/100.06, 296/100.07, 100.09
See application file for complete search history.

(56) References Cited

U.S. PATENT DOCUMENTS

| | | |
|---|---|---|
| 2,901,286 A | 8/1959 | Harris |
| 2,997,330 A | 8/1961 | Boultinghouse |
| 3,420,570 A | 1/1969 | Kunz |
| 3,514,152 A | 5/1970 | Hermon |
| 3,765,717 A | 10/1973 | Garvert |
| 3,866,972 A | 2/1975 | Reese |
| 4,261,611 A | 4/1981 | Barry et al. |
| 4,284,303 A | 8/1981 | Hather |
| 4,531,775 A | 7/1985 | Beals |
| D287,710 S | 1/1987 | Pino |
| 4,832,394 A | 5/1989 | Macomber |
| 5,009,457 A | 4/1991 | Hall |
| 5,110,021 A | 5/1992 | Dawson, Jr. |
| D332,438 S | 1/1993 | Krause |
| 5,344,159 A | 9/1994 | Powell |
| 6,152,517 A | 11/2000 | Steadman |
| 6,224,140 B1 | 5/2001 | Hoplock |
| 6,254,169 B1 | 7/2001 | Arthur |
| 6,394,532 B1 | 5/2002 | Dence |
| 6,598,930 B1 | 7/2003 | Tilton |
| 6,663,160 B1 | 12/2003 | Yarbrough et al. |
| 6,799,784 B1 | 10/2004 | Rios |

*Primary Examiner*—Joseph D. Pape
(74) *Attorney, Agent, or Firm*—Peter Loffler

(57) ABSTRACT

A convertible tonneau cover is positionable between a covering configuration wherein the tonneau covers a pickup truck bed and a rack position wherein the tonneau forms a material handling rack. A base frame attaches to and outlines an upper periphery of the truck bed. A pair of door assemblies is pivotally attached to the frame on opposite sides of the longitudinal midline of the frame that runs from the head of the truck bed to the tailgate. Each door assembly pivots between a closed position, flush with the frame and covering the bed, and an open position extending diagonally upwardly from the frame. In the open position each door assembly has kickstands that pivot downward and secure within the frame while brackets connect between the two door assemblies in order to form a material carrying rack.

12 Claims, 7 Drawing Sheets

CONVERTIBLE TONNEAU COVER

BACKGROUND OF THE INVENTION

1. Field of the Invention

The present invention relates to a lockable tonneau cover for use on a pickup truck which cover can double as a materials carrier.

2. Background of the Prior Art

The pickup truck is the workhorse of many tradesmen. The pickup truck is relatively small and nimble, allowing access to most work sites, even those that lack paved roads, yet has a bed that can carry a substantial load to the work site. The pickup truck bed can be loaded with a relatively sizable amount of material such as pipes, conduits, or lumber, or can carry needed tools to the site including compressors, generators, and a multitude of hand tools. One shortcoming experienced by pickup truck owners concerns the need to carry a diversified load. Many workers, such as framers and plumbers, need a wide assortment of hand tools as well as the needed supplies to carry out the job. While the materials are generally secured at a supply house that is frequented on the way to the job site, the tools remain with the worker from job to job. As these tools are relatively small and valuable, they must be protected from theft whenever the worker is away from the truck such as at the supply house, at lunch, or even at home after hours as unloading and the reloading a large amount of hand tools can be quite time-consuming and labor-intensive.

To address the need to secure hand tools, many pickup truck owners securely install some form of tool box within the pickup truck bed and lock the tool box as needed. Such boxes generally take one of two forms, either a large box that is bolted to the truck bed at its forward end or a tonneau cover that uses the truck bed's floor and four sides as part of the box with the cover forming the top of the box. In either case, the locks used with the tool box help prevent theft of the valuable tools from all but the most ardent of thieves. The problem created by the use of these tool boxes is that they, by necessity, take up valuable real estate within the pickup truck bed leaving less room to carry bulky supplies such as pipe or lumber. This results in the need to make multiple stops at the supply house which is time-consuming especially on a remote location site. Alternately, the tradesman has the supply house deliver the needed materials. However, this alternative can increase the costs to the tradesman from the delivery charges imposed by the supply house and can be time inefficient as the tradesman might be sitting idle at the job site waiting for the supply truck to arrive. Still a further solution is to have a second person help the tradesman get the supplies in this second person's truck. However, the problem with this method is that it is inefficient in requiring a second person and truck to accomplish the job, can still be problematic if the selected second person's truck lacks space due to the presence of a tool box within the truck, and the potential exists that no such second person is available.

To address such concerns, devices have been proposed that allow a pickup truck owner to carry a locked tool box while at the same time have sufficient room within the pickup truck to carry a relatively large supply of job materials. One type of such device is a truck rack that is bolted into the pickup truck bed and rises over the bed and oftentimes over the pickup truck cab. Any tool boxes are secured within the pickup truck bed in the usual way and materials are secured on the rack. While this type of device solves some of the tradesman's problems, these devices are not without shortcomings. Many of these devices, due to the structural struts used to form the racks, make access to the tool box within the bed awkward. Additionally, as such devices are fixedly attached to the pickup truck, movement of large objects, such as a refrigerator, tends to be difficult requiring the removal of the rack from the truck, which may be a very difficult and time-consuming undertaking. Furthermore, the rack clearly identifies the truck as a work truck which is undesirable to some workers who use the truck for personal purposes such as dating and do not want to use a "work truck" while others live in neighborhoods where the parking of work trucks may be restricted by restrictive covenants of the neighborhood.

Another type of device that is used is a convertible tonneau cover that covers the bed of the pickup truck and locks in place protecting the tools, yet also converts to a rack system that is capable of carrying needed supplies without the need to unload the tools. These devices allow a truck owner to carry tools securely and also carry a relatively large amount of material simultaneously while allowing the "removal" of the rack after the work day so as not to permanently mark the pickup truck as a work truck. The problem with such convertible tonneau covers is that many such devices are unduly complex in design. This makes such devices relatively expensive to obtain and also makes converting the device between standard tonneau cover and a rack-based system difficult and time-consuming. Additionally, many devices, due to the temporary nature of the rack to which the devices are converted, result in a rack that lacks the structural integrity of a fixed truck rack system. As a result, such systems are limited in the size of the load which can be placed upon the rack to which the device converts.

What is needed is a device that allows a worker to carry tools within the bed of a pickup truck with the ability to lock the tools whenever needed, while at the same time being able to carry a relatively large amount of supplies to a work site. Such a device must be of relatively simple design and construction so that it is not unduly expensive to produce and obtain and so that the device is capable of converting between a standard tonneau cover and a rack-based system in relatively short order. Such a device must be able to convert to a rack-based system that has substantial structural integrity so as to be able to handle relatively large material loads. Such a device must allow a user to be able to minimize the work truck look associated with the pickup truck.

SUMMARY OF THE INVENTION

The convertible tonneau cover of the present invention addresses the aforementioned needs in the art. The convertible tonneau cover fits onto a pickup truck bed and allows a worker to carry tools within the bed of a pickup truck with the ability to lock the tools whenever needed. The convertible tonneau cover also allows the pickup truck to carry a relatively large amount of supplies to a work site. The convertible tonneau cover is of relatively simple design and construction so that it is relatively inexpensive to produce thereby making it affordable to a large number of tradesmen. The present invention is capable of converting between a standard tonneau cover and a rack-based system in relatively short order. The convertible tonneau cover is able to convert to a rack-based system that has substantial structural integrity allowing the device to be able to handle relatively large material loads. The convertible tonneau cover lacks the hardcore tell-tale signs of a work truck and allows an owner to be able to minimize the work truck look associated with the pickup truck.

The convertible tonneau cover of the present invention is comprised of a base frame that is attached to an upper periphery of a pickup truck bed in outlining relationship with the upper periphery of the bed, the base frame having a longitudinal midline that extends between the head of the pickup truck bed and the tailgate thereof. A first door assembly is pivotally attached to the base frame on a first side of and adjacent to the midline of the base frame such that the first door assembly is capable of opening and closing with respect to the base frame. A plurality of first kickstands is pivotally attached to the first door assembly such that each of the plurality of first kickstands extends between the first door assembled and the base frame whenever the first door assembly is open. A second door assembly is pivotally attached to the base frame on a second side of and adjacent to the midline of the base frame such that the second door assembly is capable of opening and closing with respect to the base frame. A plurality of second kickstands is pivotally attached to the second door assembly such that each of the plurality of second kickstands extends between the second door assembly and the base frame whenever the second door assembly is open. A first bracket is attached to the first door assembly and to the second door assembly whenever the first door assembly is open and the second door assembly is open while a second bracket is attached to the first door assembly and to the second door assembly whenever the first door assembly is open and the second door assembly is second open. The base frame has a first handle and the first door assembly has a second handle that is aligned with the first handle whenever the first door assembly is closed and the base frame has a third handle and the second door assembly has a fourth handle that is aligned with the third handle whenever the second door assembly is closed. This allows locking of the two door assemblies. Each of the plurality of first kickstands is received within a respective first gusset attached to the base frame whenever the first door assembly is open and each of the plurality of second kickstands is received within a respective second gusset attached to the base frame whenever the second door assembly is open. The first door assembly has a first frame assembly and a first cover attached to a first top of the first frame assembly while the second door assembly has a second frame assembly and a second cover attached to a second top of the second frame assembly. The base frame has a brace that extends along a length of the midline. The base frame has a first end and an opposing second end joined by a first side and an opposing second side such that the longitudinal midline extends between the first end and the second end and the first door assembly is pivotally attached to the first end and to the second end on the first side of the midline and the second door assembly is pivotally attached to the first end and to the second end on the second side of the midline.

BRIEF DESCRIPTION OF THE DRAWINGS

Similar reference numerals refer to similar parts throughout the several views of the drawings.

DESCRIPTION OF THE PREFERRED EMBODIMENT

Figures 2, 3, 4:
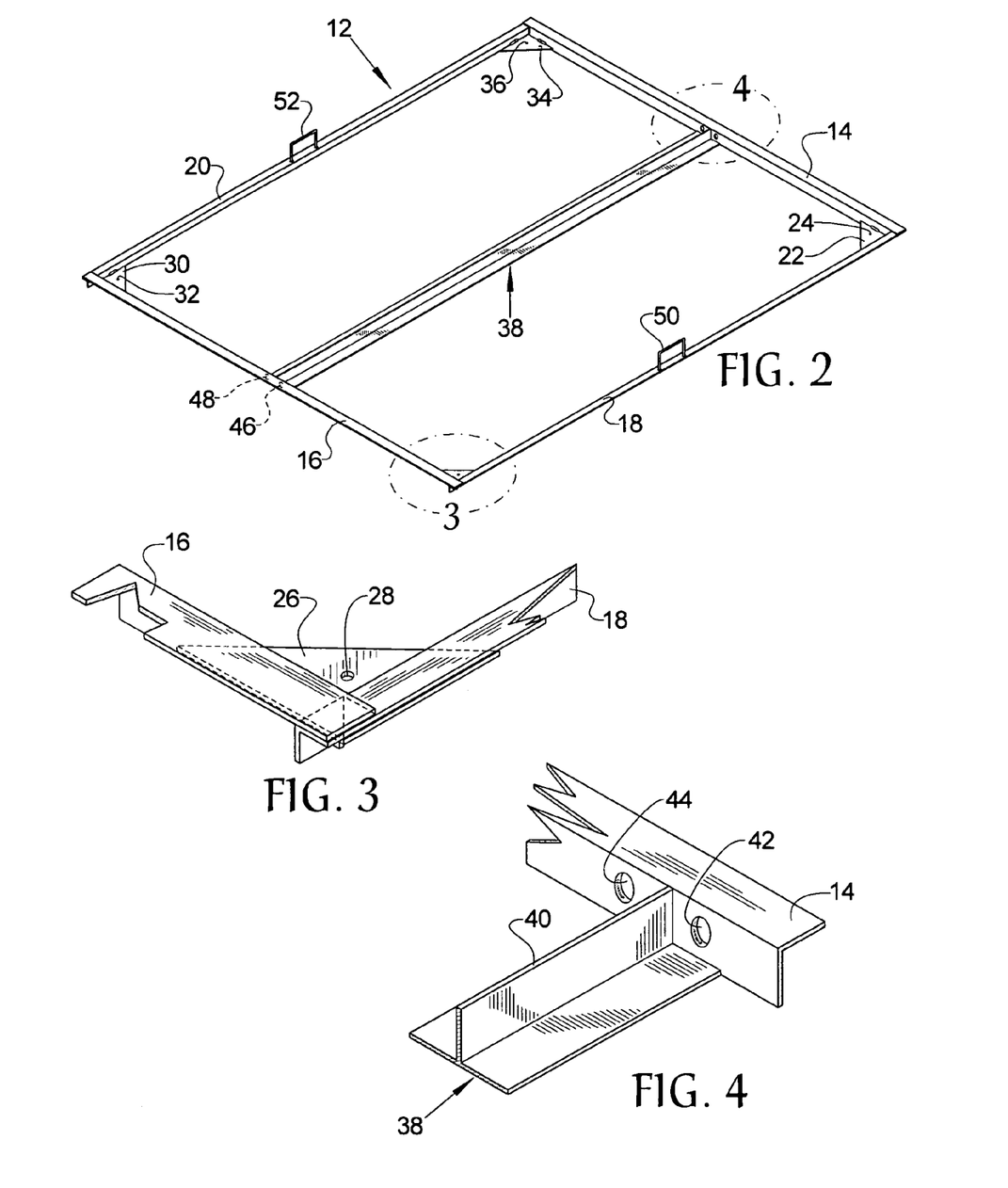
FIG. 2 is a perspective view of the base frame used with the convertible tonneau cover.
FIG. 3 is a detail view of the gusseted portion of the base frame noted in FIG. 2.
FIG. 4 is a detail view of the portion of the base frame noted in FIG. 2.

Referring now to the drawings, it is seen that the convertible tonneau cover of the present invention, generally denoted by reference numeral 10, is comprised of base frame 12 that is generally rectangular in shape and that has a first end 14, an opposed second end 16, a first side 18 that connects the first end 14 and the second end 16, and an opposed second side 20 that also connects the first end 14 and the second end 16. As seen a first gusset plate 22 with a first opening 24 connects the first end 14 with the first side 18, a second gusset plate 26 with a second opening 28 connects the first side 18 with the second end 16, a third gusset plate 30 with a third opening 32 connects the second end 16 with the second side 20, and a fourth gusset plate 34 with a fourth opening 36 connects the second side 20 with the first end 14. A brace 38 extends between the first end 14 and the second end 16 along the longitudinal midline of the base frame 12. As seen, the brace 38 is an inverted T with the leg 40 of the T being on the longitudinal midline and dividing the base frame into a first half and a second half. A first opening 42 is located on the first end 14 on one side of the leg 40 of the brace 38 while a second opening 44 is located on the first end 14 on the opposite side of the leg 40 of the brace 38. A third opening 46 is located on the second end 16 on one side of the leg 40 of the brace 38, this third opening 46 facing the first opening 42 on the first end 14, while a fourth opening 48 is located on the second end 16 on the opposite side of the leg 40 of the brace 38, this fourth opening 48 facing the second opening 44 on the first end 14. A first handle 50 is located on the first side 14 of the base frame 12 while a second handle 52 is located on the second side 20 of the base frame 12. The base frame 12 is made from an appropriate and sturdy material such as metal including aluminum.

Figure 1:
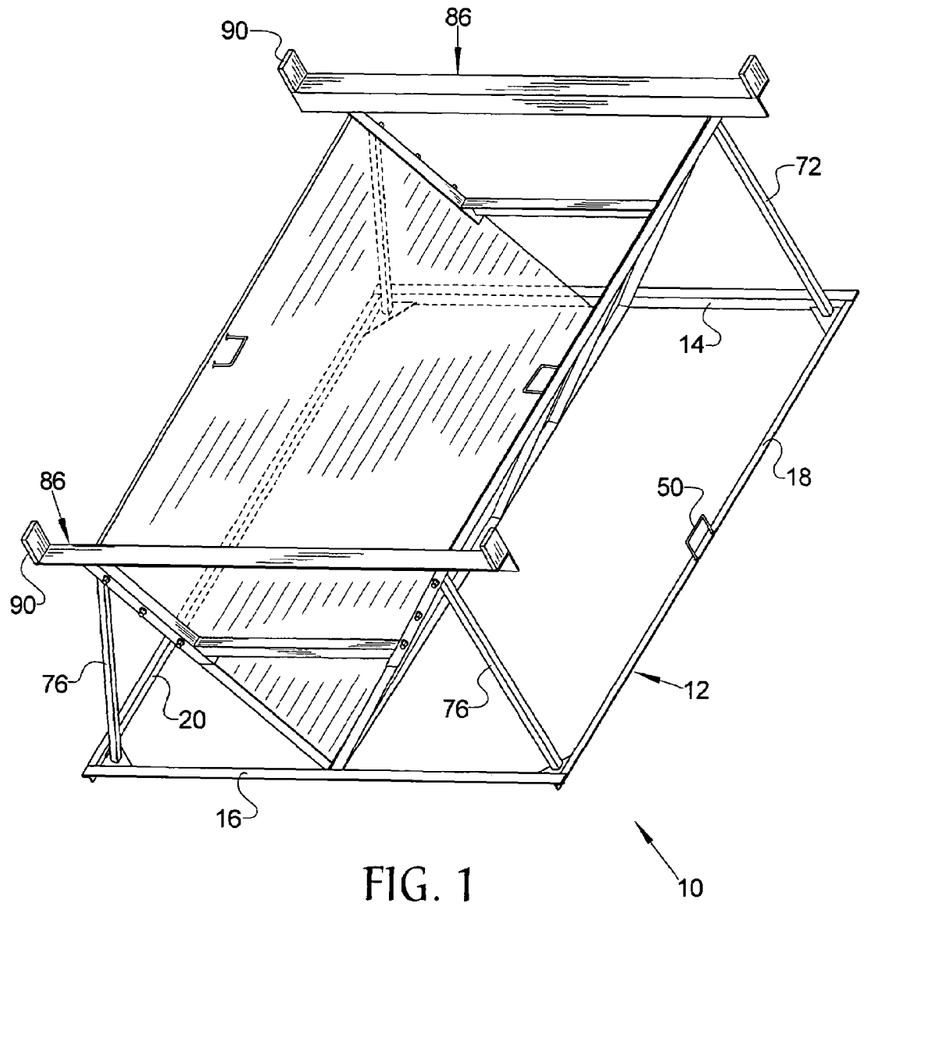
FIG. 1 is a perspective view of the convertible tonneau cover of the present invention.
Figures 5, 6:
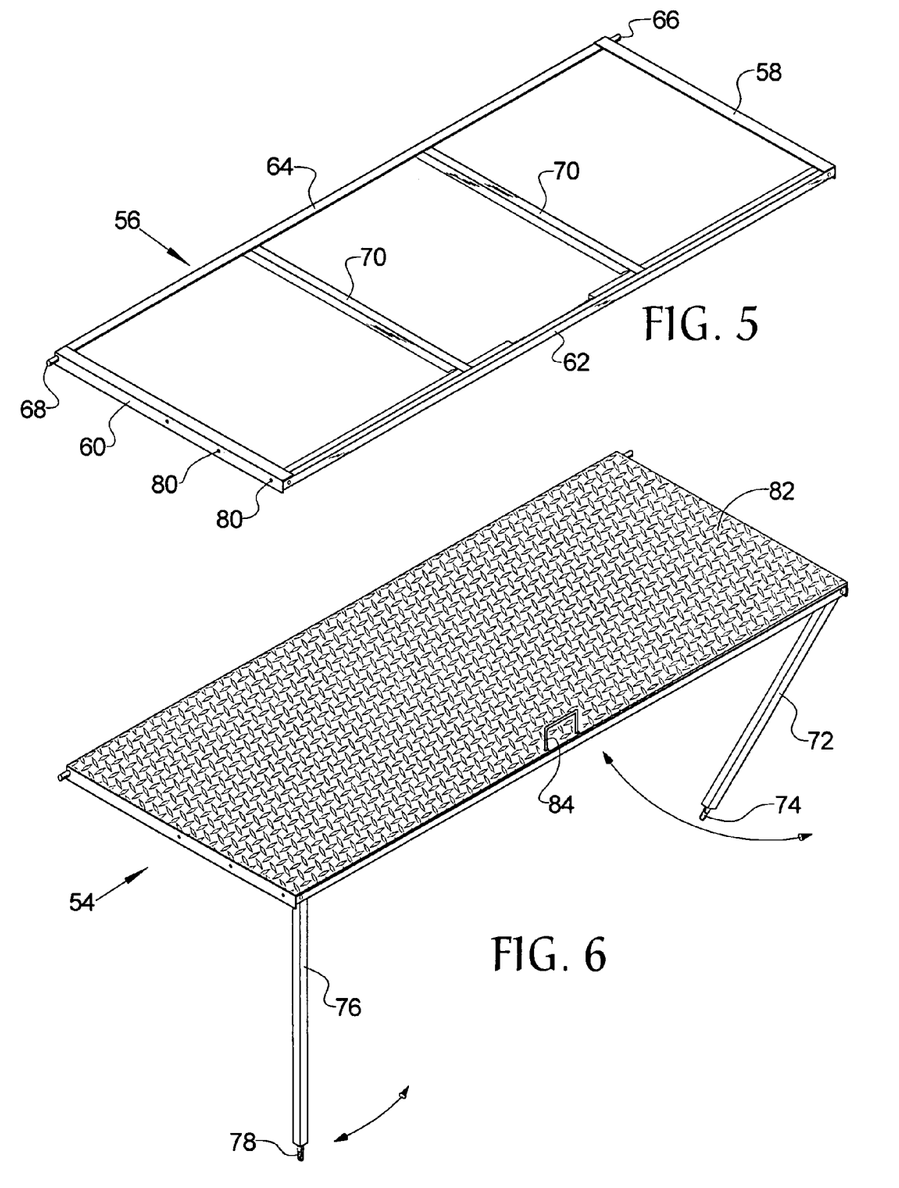
FIG. 5 is a perspective view of the door frame with the kickstands stored.
FIG. 6 is a perspective view of the door assembly.
Figure 12:
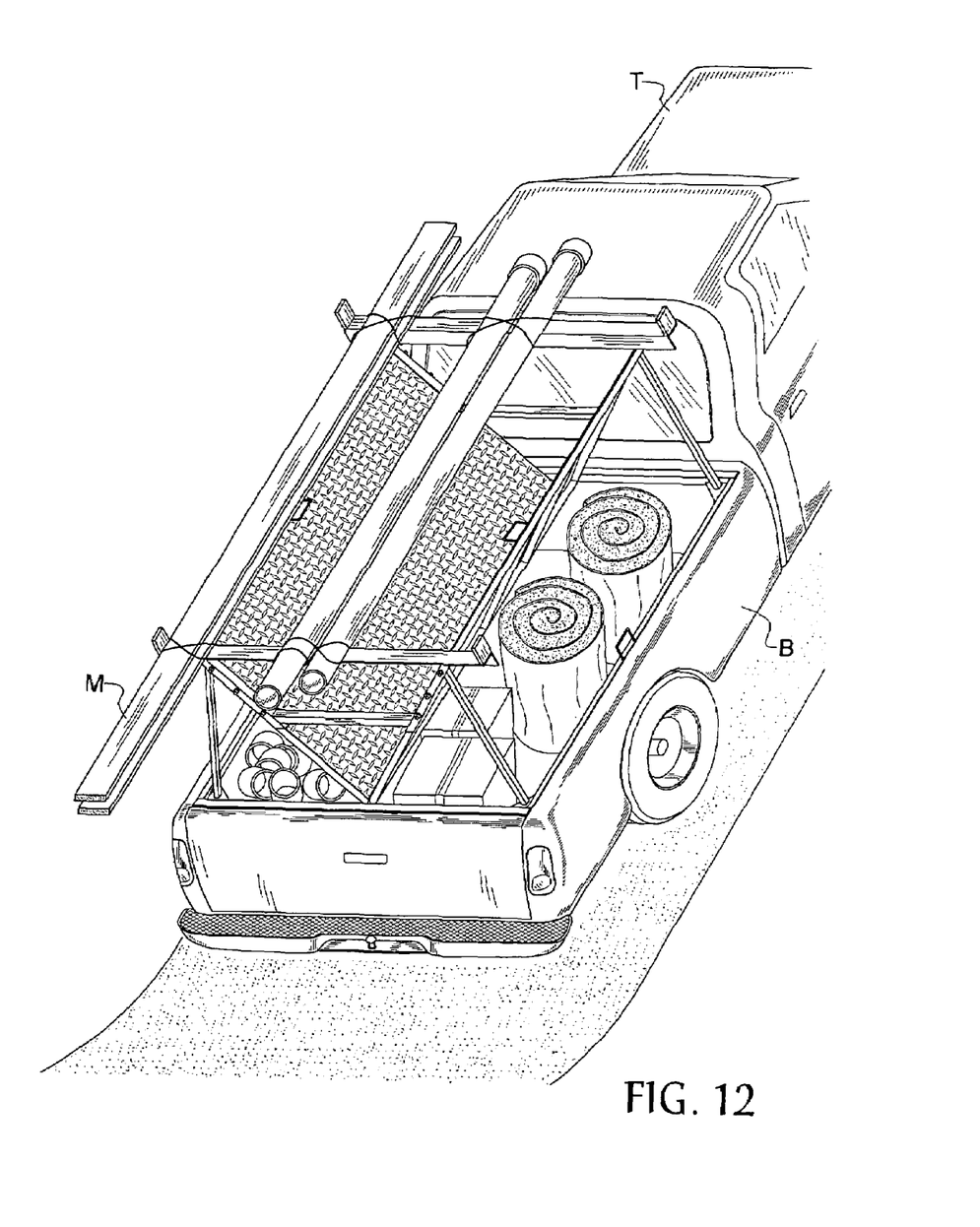
FIG. 12 is a perspective view of the convertible tonneau cover is use on a pickup truck in a rack configuration.

A door assembly 54 has a generally rectangular-shaped door frame 56 that has a first end 58 and a second end 60 opposite the first end 58, while a first side 62 connects the first end 58 and the second end 60 and a second side 64 also connects the first end 58 with the second end 60, the second side 64 being opposite the first side 62. A first pin 66 extends outwardly from the first end 58 of the door frame 56 and is longitudinally aligned with the second side 64 of the door frame 56, while a second pin 68 extends outwardly from the second end 60 of the door frame 56 and is aligned with the first pin 66. One or more cross braces 70 extend between the first side 62 and the second side 64 of the door frame 56 in order to give the door frame 56 structural rigidity. A first kickstand 72 is pivotally connected to the first side 62 of the door frame 56 proximate the first end 58, the first kickstand 72 having a pin 74 extending from its distal end, while a second kickstand 76 is pivotally connected to the first side 62 of the door frame 56 proximate the second end 60, the second kickstand 76 having a pin 78 extending from its distal end. The first kickstand 72 and the second kickstand 76 can each be pivoted to a tucked position wherein each kickstand 72 and 76 is flush against the first side 62 of the door frame 56, as best seen in FIG. 5 and an extended position wherein each kickstand 72 and 76 extends downwardly from the door frame 56 as best seen in FIGS. 1, 6, and 12. One or more openings 80 are located along a length of the second end 60 of the door frame 56 while a corresponding series of openings (not illustrated) are located along a length of the first end 58 of the door frame 56. A cover 82 is attached to the top of the door frame 56, which cover 82 can have any appropriate design thereon such as the illustrated diamond-plate. A handle 84 extends upwardly from the cover 82. The door assembly 54 is made from the same or similar material as the material used to make the base frame 12.

Figure 7:
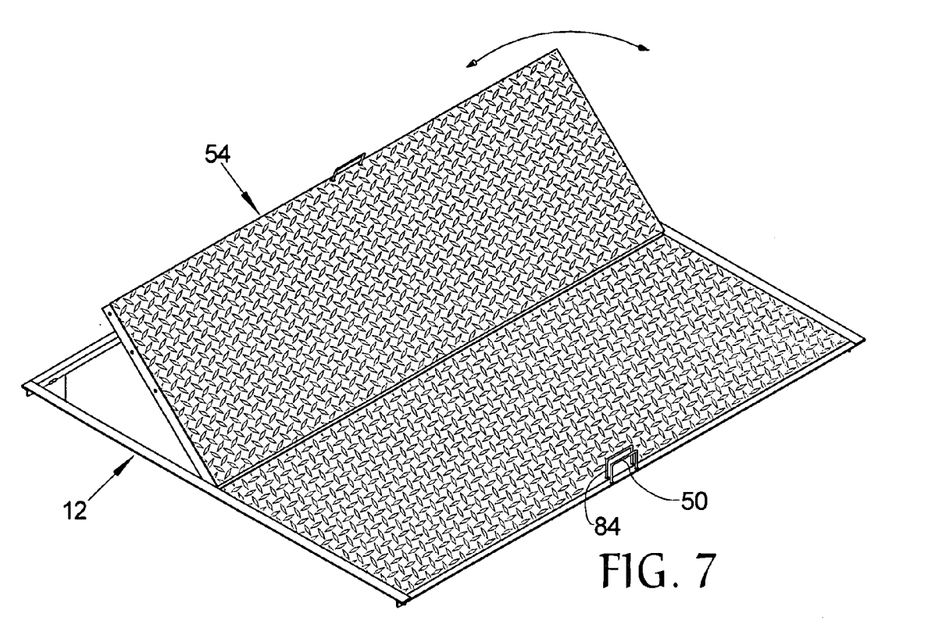
FIG. 7 is a perspective view of the door assembly mounted within the base frame.
Figure 8:
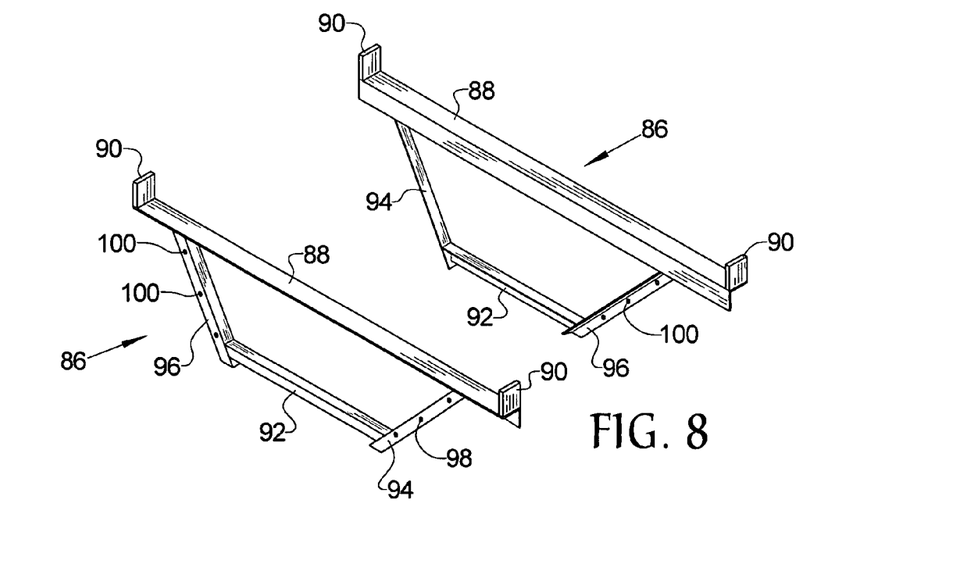
FIG. 8 is a perspective view of the front and back of the pair of rack brackets.
Figure 13:
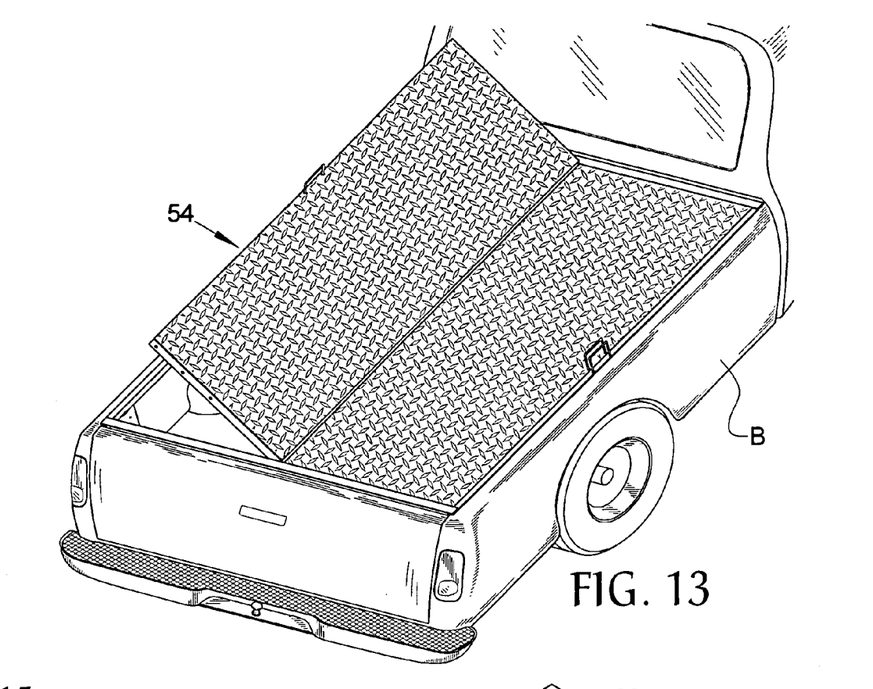
FIG. 13 is a perspective view of the convertible tonneau cover in use on a pickup truck in a cover configuration.
Figure 14:
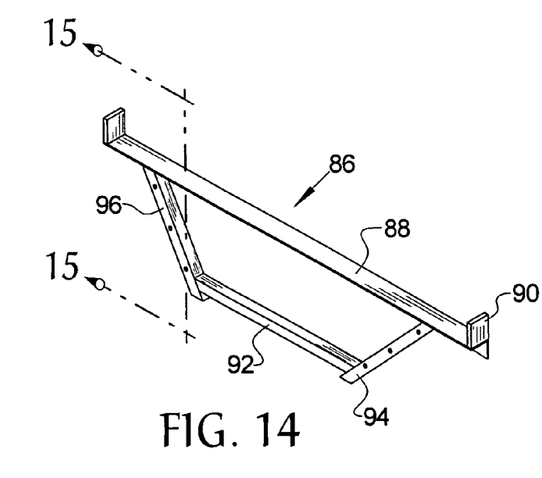
FIG. 14 is a perspective view of a single rack bracket.
Figure 15:
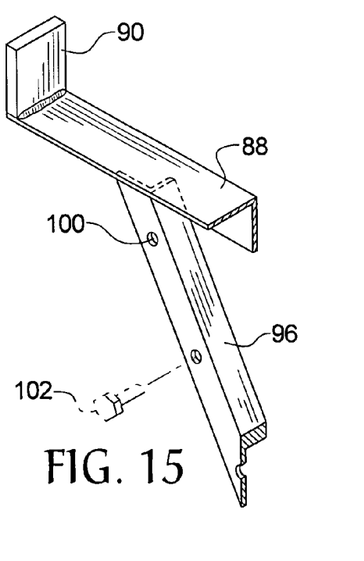
FIG. 15 is a sectional view of the rack bracket taken along line 15—15 in FIG. 14.

A bracket 86 has a generally isosceles trapezoid shape and has an upper leg 88 that may have upwardly extending wings 90 on either end, a lower leg 92 that is parallel with the upper leg 88, a first diagonal leg 94 that extends diagonally between the upper leg 88 and the lower leg 92 and a second diagonal leg 96 that also extends diagonally between the upper leg 88 and the lower leg 92 at a complementary angle relative to the first diagonal leg 94. As seen, the first diagonal leg 94 has a series of openings 98 thereon, while the second diagonal leg 96 also has a series of openings 100 therein The base frame 12 is attached to the upper periphery of a pickup truck T bed B so that the base frame 12 outlines this outer periphery (many pickup truck beds B are not precisely rectangular for aerodynamic purposes and the base frame 12 is similarly not precisely rectangular so that the base frame 12 properly outlines the upper periphery of the pickup truck bed B) and the base frame 12 is secured in place in any desired manner such as by passing screws (not illustrated) through the base frame 12 and the bed B at strategic points. The door assembly 54 is installed within the base frame 12 by positioning the door assembly 54 within one of the halves of the base frame 12 as delineated by the leg 40 of the brace 38 of the base frame 12. The first pin 66 of the door frame 56 is received within the first opening 42 of the first end 14 of the base frame 12 while the second pin 68 of the door frame 56 is received within the third opening 46 of the second end 16 of the base frame 12. The door assembly 54 is sized to just fit within the half of the base frame 12 and pivot along the longitudinal midline of the base frame 12. A second door assembly 54 is installed on the other side of the longitudinal midline of the base frame 12 is similar fashion. Once each door assembly 54 is installed, each door assembly 54 is capable of pivoting between a raised position and a lowered position. In the lowered position, best seen in FIGS. 7 and 13, the door assembly 54 is generally flush with base frame 12 with the kickstands 72 and 76 in a tucked position. The handle 84 on the door assembly 54 aligns with its respective handle 50 or 52 on the base frame 12 allowing a lock to be passed through the two handles 84 and 50 or 52 in order to lock the door assembly 54 in place and prevent access into the interior of the pickup truck bed B. In this lowered position, the door frame 56 rests on the gusset plates 22 and 26 or 30 and 34 of that half of the base frame 12. In the raised position, best illustrated in FIGS. 1 and 12, each door assembly 54 is pivoted upwardly and its kickstands 72 and 76 are pivoted to their untucked positions. The door assembly is pivoted until the pin 74 of the first kickstand 72 is able to be received within the first opening 24 of the first gusset plate 22 (or the fourth opening 36 of the fourth gusset plate 34) and the pin 78 of the second kickstand 76 is able to be received within the second opening 28 of the second gusset plate 26 (or the third opening 32 of the third gusset plate 30). Each door assembly 54 is so positioned so that the two open door assemblies 54 form a V. A first bracket 86 is positioned down into the V such that the openings 98 of the first diagonal leg 94 align with the openings 80 on the second end 60 of one of the door assemblies 54 and the openings 100 on the second diagonal leg 96 align with the openings 80 on the second end 60 of the other door assembly 54. Bolts 102 are passed through the aligned opening pairs 98-80 and 100-80. Similarly, a second bracket 86 is positioned on the opposite side of the device 10 such that the openings 98 and 100 align with their corresponding openings on the first end 58 of the door frame 54 and are similarly bolted. The convertible tonneau cover is now in a rack configuration and is capable of carrying material M on the two brackets 86 while maintaining standard cargo capacity within the bed B of the truck T. When use of the rack is no longer needed, the bolts 102 are removed from the various aligned opening pairs, each kickstand 72 and 76 is removed from its respective gusset opening, and each door assembly 54 is pivoted back to its closed position and locked as needed.

Figure 9:
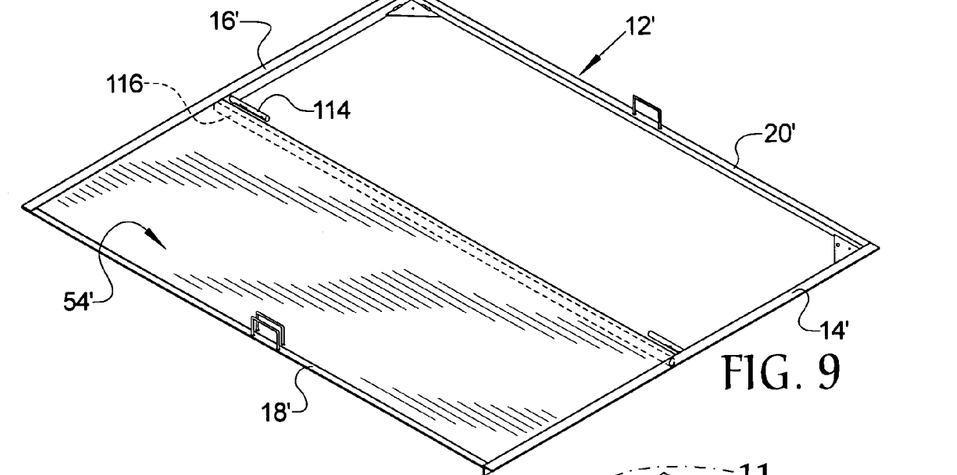
FIG. 9 is a perspective view of an alternate embodiment of the convertible tonneau cover of the present invention.
Figure 10:
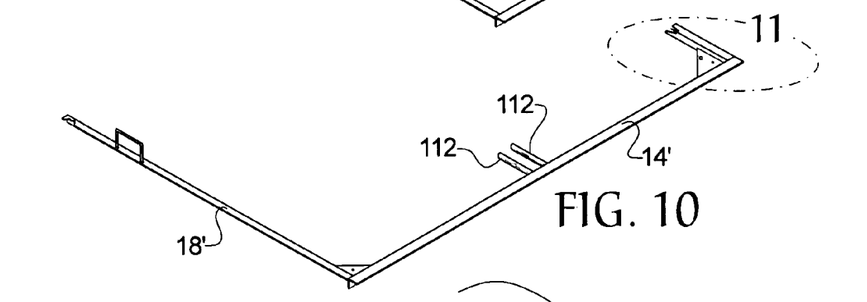
FIG. 10 is a detail view of the base frame of the tonneau cover of FIG. 9.
Figure 11:
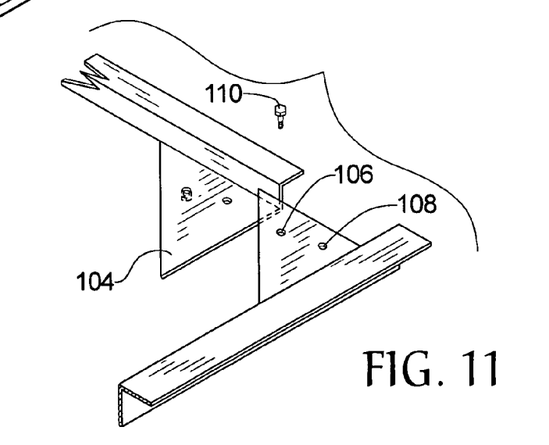
FIG. 11 is a detail view of the gussets noted in FIG. 10.

As seen in FIGS. 10 and 11, the device 10 can be made to be more readily disassembleable. In such an embodiment, each end of the first end 14', the second end 16', the first side 18' and the second side 20' would have its own gusset plate 104 thereon, each gusset plate 104 having a first opening 106 and a second opening 108. When the base frame 12' is assembled, as each of the four legs of the base frame 12' are brought together, the two gusset plates 104 on the end of each leg overlap one another such that each first opening 106 on the overlapped gusset plates 104 aligns as does each second opening 108. A bolt 110 is passed through the aligned first openings 106 in order to hold the two overlapped gusset plates 104 together and thus form the base frame 12'. The pins 74 and 78 of the two kickstands 72 and 76 respectively are received within the aligned second openings 108 on the overlapped gusset plates 104. Additionally, instead of using a brace 38, a pair of pins 112 extend outwardly from the first end 14' of the base frame 12' toward the second end 16' of the base frame 12', each of the two pins 112 being on opposing sides of the longitudinal midline of the base frame 12'. A second pair of pins 114 extends outwardly from the second end 16' of the base frame 12' toward the first end 14' each of the second pins 114 aligned with a respective one of the first pins 112. Additionally, each door assembly 54' has an opening 116 that receives one each of the first pin 112 and the second pin 114 in order to achieve pivotal attachment to the base frame 12'. In all other respects the two embodiments are equivalent.

While the invention has been particularly shown and described with reference to an embodiment thereof, it will be appreciated by those skilled in the art that various changes in form and detail may be made without departing from the spirit and scope of the invention.

I claim:

1. A cover for attachment to a bed of a pickup truck, the bed having an upper periphery, the cover comprising:
   a base frame adapted to be attached to the upper periphery of the bed in outlining relationship with the upper periphery, the base frame having a longitudinal midline;
   a first door assembly pivotally attached the base frame on a first side of and adjacent to the midline of the base frame, the first door assembly having a first kickstand pivotally attached to a first end of the first door assembly and capable of pivoting between a first position wherein the first kickstand is flush against the first door assembly and a second position wherein the first kickstand extends downwardly from the first door assembly, the first door assembly having a second kickstand pivotally attached to a second end of the first door assembly and capable of pivoting between the first position and the second position, the first door assembly capable of pivoting between a first closed position wherein the first kickstand is in the first position, the second kickstand is in the first position and the first door assembly is flush against the base frame, and a first open position wherein the first door assembly is positioned at an angle relative to the base frame and the first kickstand is in the second position and attached to the base frame and the second kickstand is in the second position and attached to the base frame;
   a second door assembly pivotally attached the base frame on a second side of and adjacent to the midline of the base frame, the second door assembly having a third kickstand pivotally attached to a third end of the second door assembly and capable of pivoting between a third position wherein the third kickstand is flush against the second door assembly and a fourth position wherein the second kickstand extends downwardly from the second door assembly, the second door assembly having a fourth kickstand pivotally attached to a fourth end of the second door assembly and capable of pivoting between the third position and the fourth position, the second door assembly capable of pivoting between a second closed position wherein the third kickstand is in the third position, the fourth kickstand is in the third position and the second door assembly is flush against the base frame, and a second open position wherein the second door assembly is positioned at an angle relative to the base frame and the third kickstand is in the fourth position and attached to the base frame and the fourth kickstand is in the fourth position and attached to the base frame;
   a first bracket attached to the first door assembly and to the second door assembly whenever the first door assembly is in the first open position and the second door assembly is in the second open position; and
   a second bracket attached to the first door assembly and to the second door assembly whenever the first door assembly is in the first open position and the second door assembly is in the second open position.

2. The cover as in claim 1 wherein the base frame has a first handle and the first door assembly has a second handle that is aligned with the first handle whenever the first door assembly is in the first closed position and the base frame has a third handle and the second door assembly has a fourth handle that is aligned with the third handle whenever the second door assembly is in the second closed position.

3. The cover as in claim 1 wherein the first kickstand is received within a first gusset attached to the base frame whenever the first kickstand is in the second position, the second kickstand is received within a second gusset attached to the base frame whenever the second kickstand is in the second position, the third kickstand is received within a third gusset attached to the base frame whenever the third kickstand is in the fourth position, and the fourth kickstand is received within a fourth gusset attached to the base frame whenever the fourth kickstand is in the fourth position.

4. The cover as in claim 1 wherein the first door assembly has a first frame assembly and a first cover attached to a first top of the first frame assembly and the second door assembly has a second frame assembly and a second cover attached to a second top of the second frame assembly.

5. The cover as in claim 1 wherein the base frame has a brace that extends along a length of the midline.

6. The cover as in claim 1 wherein the base frame has a first end and an opposing second end joined by a first side and an opposing second side such that the longitudinal midline extends between the first end and the second end and the first door assembly is pivotally attached to the first end and to the second end on the first side of the midline and the second door assembly is pivotally attached to the first end and to the second end on the second side of the midline.

7. A cover for attachment to a bed of a pickup truck, the bed having an upper periphery, the cover comprising:
   a base frame adapted to be attached to the upper periphery of the bed in outlining relationship with the upper periphery, the base frame having a longitudinal midline;
   a first door assembly pivotally attached the base frame on a first side of and adjacent to the midline of the base frame such that the first door assembly is capable of opening and closing with respect to the base frame;
   a plurality of first kickstands pivotally attached to the first door assembly such that each of the plurality of first kickstands extends between the first door assembly and the base frame whenever the first door assembly is open;
   a second door assembly pivotally attached the base frame on a second side of and adjacent to the midline of the base frame such that the second door assembly is capable of opening and closing with respect to the base frame;
   a plurality of second kickstands pivotally attached to the second door assembly such that each of the plurality of second kickstands extends between the second door assembled and the base frame whenever the second door assembly is open;
   a first bracket attached to the first door assembly and to the second door assembly whenever the first door assembly is open and the second door assembly is open; and
   a second bracket attached to the first door assembly and to the second door assembly whenever the first door assembly is open and the second door assembly is open.

8. The cover as in claim 7 wherein the base frame has a first handle and the first door assembly has a second handle that is aligned with the first handle whenever the first door assembly is closed and the base frame has a third handle and the second door assembly has a fourth handle that is aligned with the third handle whenever the second door assembly is closed.

9. The cover as in claim 7 wherein each of the plurality of first kickstands is received within a respective first gusset attached to the base frame whenever the first door assembly is open and each of the plurality of second kickstands is received within a respective second gusset attached to the base frame whenever the second door assembly is open.

10. The cover as in claim 7 wherein the first door assembly has a first frame assembly and a first cover attached to a first top of the first frame assembly and the second door assembly has a second frame assembly and a second cover attached to a second top of the second frame assembly.

11. The cover as in claim 7 wherein the base frame has a brace that extends along a length of the midline.

12. The cover as in claim 7 wherein the base frame has a first end and an opposing second end joined by a first side and an opposing second side such that the longitudinal midline extends between the first end and the second end and the first door assembly is pivotally attached to the first end and to the second end on the first side of the midline and the second door assembly is pivotally attached to the first end and to the second end on the second side of the midline.

* * * * *